US012625357B2

(12) United States Patent
Ritschel et al.

(10) Patent No.: US 12,625,357 B2
(45) Date of Patent: May 12, 2026

(54) FLUORESCENCE MICROSCOPE SYSTEM AND METHOD

(71) Applicant: LEICA MICROSYSTEMS CMS GMBH, Wetzlar (DE)

(72) Inventors: Kai Ritschel, Wetzlar (DE); Oliver Schlicker, Wetzlar (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 490 days.

(21) Appl. No.: 18/065,010

(22) Filed: Dec. 13, 2022

(65) Prior Publication Data

US 2023/0196513 A1 Jun. 22, 2023

(30) Foreign Application Priority Data

Dec. 16, 2021 (EP) ..................................... 21215122

(51) Int. Cl.
*G02B 21/00* (2006.01)
*G01N 21/64* (2006.01)

(52) U.S. Cl.
CPC ..... *G02B 21/0076* (2013.01); *G01N 21/6458* (2013.01); *G06T 2207/10024* (2013.01); *G06T 2207/10056* (2013.01); *G06T 2207/10064* (2013.01)

(58) Field of Classification Search
None
See application file for complete search history.

(56) References Cited

U.S. PATENT DOCUMENTS

| | | | | |
|---|---|---|---|---|
| 2002/0131634 A1* | 9/2002 | Weibrecht | ................ | H04N 9/43 |
| | | | | 382/162 |
| 2014/0118524 A1* | 5/2014 | Munck | ................. | G02B 21/008 |
| | | | | 382/133 |
| 2019/0174050 A1* | 6/2019 | Somayaji | ............. | H04N 23/745 |

(Continued)

FOREIGN PATENT DOCUMENTS

| | | | | | |
|---|---|---|---|---|---|
| CN | 112651907 A | * | 4/2021 | | |
| EP | 1345170 A1 | * | 9/2003 | ............. | G06T 5/002 |

(Continued)

OTHER PUBLICATIONS

Makkapati, V., Agrawal, R., & Acharya, R. (2009). Segmentation and classification of tuberculosis bacilli from ZN-stained sputum smear images. In 2009 IEEE International Conference on Automation Science and Engineering (pp. 217-220). (Year: 2009).*

(Continued)

*Primary Examiner* — Jonathan S Lee
*Assistant Examiner* — Christine Zhao
(74) *Attorney, Agent, or Firm* — LEYDIG, VOIT & MAYER, LTD.

(57) ABSTRACT

A fluorescence microscope system including an optical detection system configured to capture a raw image of a sample, the raw image including a plurality of pixels, each pixel having a brightness value and a processor, configured to determine one or more invalid pixels in the raw image, assign a predetermined value to each invalid pixel, determine a range of brightness values including the brightness values of a majority of the plurality of pixels excluding the one or more invalid pixels, and generate a processed image of the sample based on the determined range of brightness values.

12 Claims, 4 Drawing Sheets

(56) References Cited

U.S. PATENT DOCUMENTS

| | | | | |
|---|---|---|---|---|
| 2021/0042988 A1* | 2/2021 | Molyneaux | ............ | G06F 3/013 |
| 2021/0349028 A1* | 11/2021 | Pelzer | ................ | G01N 21/6458 |
| 2023/0169930 A1* | 6/2023 | Pytlarz | .................... | G09G 5/02 |

FOREIGN PATENT DOCUMENTS

| | | | | | | |
|---|---|---|---|---|---|---|
| EP | 3 907 497 A1 | | 11/2021 | | | |
| JP | H0969936 A | * | 3/1997 | | | |
| JP | 2002102146 A | * | 4/2002 | | | |
| JP | 2006271870 A | * | 10/2006 | | ............ | G06T 5/002 |
| WO | WO 2013/002720 A1 | | 1/2013 | | | |

OTHER PUBLICATIONS

Bimber et al.: "Closed-Loop Feedback Illumination for Optical Inverse Tone-Mapping in Light Microscopy", IEEE Transactions on Visualization and Computer Graphics, vol. 17, No. 6, Jun. 2011, IEEE, US, pp. 857-870.

\* cited by examiner

S200

S202

S204

S206

S208

S210

S212

S214

S216

FLUORESCENCE MICROSCOPE SYSTEM AND METHOD

CROSS-REFERENCE TO RELATED APPLICATIONS

This application claims benefit to European Patent Application No. EP 21215122.9, filed on Dec. 16, 2021, which is hereby incorporated by reference herein.

FIELD

The invention relates to a fluorescence microscope system and a method for generating a processed image of a sample with a fluorescence microscope system.

BACKGROUND

A fluorescence microscopic image comprises a plurality of pixels that each correspond to a data point of a fluorescence microscopic measurement. In most cases, each pixel has a brightness value that corresponds to a detected fluorescence intensity. In other cases, the fluorescence microscopic image is the result of a mathematical reconstruction, for example by means of a spectral unmixing algorithm. In these cases, each pixel may also be assigned a confidence value that represents a certainty with which the algorithm has determined the brightness value of the respective pixel.

There are various reasons why a pixel of the fluorescence microscopic image could be considered invalid. For example, the pixel could be saturated, for example due to the detected fluorescence intensity exceeding the dynamic range of the detector. It is also possible that an error occurred during the detector readout resulting in one or more pixels having a brightness value that does not correspond to the fluorescence intensity. Further, a pixel might be considered invalid if an error occurred during the mathematical reconstruction of the fluorescence intensity resulting in a low confidence value associated with the respective pixel. The invalid pixel are artifacts in the fluorescence microscopic image that have to be taken into account when displaying or further processing the image.

In fluorescence microscopy, it is common to work with weak signals that utilize only a small range of the dynamic range of the detector. In order to display this weak signal well, a range of brightness values including the signal, i.e. that comprises information about the sample, is selected and extended to the full dynamic range of a display unit. However, since the invalid pixels comprise no information about the sample, the invalid pixels interfere with the determination of the range of brightness values.

SUMMARY

In an embodiment, the present disclosure provides a fluorescence microscope system comprising an optical detection system configured to capture a raw image of a sample, the raw image comprising a plurality of pixels, each pixel having a brightness value and a processor, configured to determine one or more invalid pixels in the raw image, assign a predetermined value to each invalid pixel, determine a range of brightness values comprising the brightness values of a majority of the plurality of pixels excluding the one or more invalid pixels, and generate a processed image of the sample based on the determined range of brightness values.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
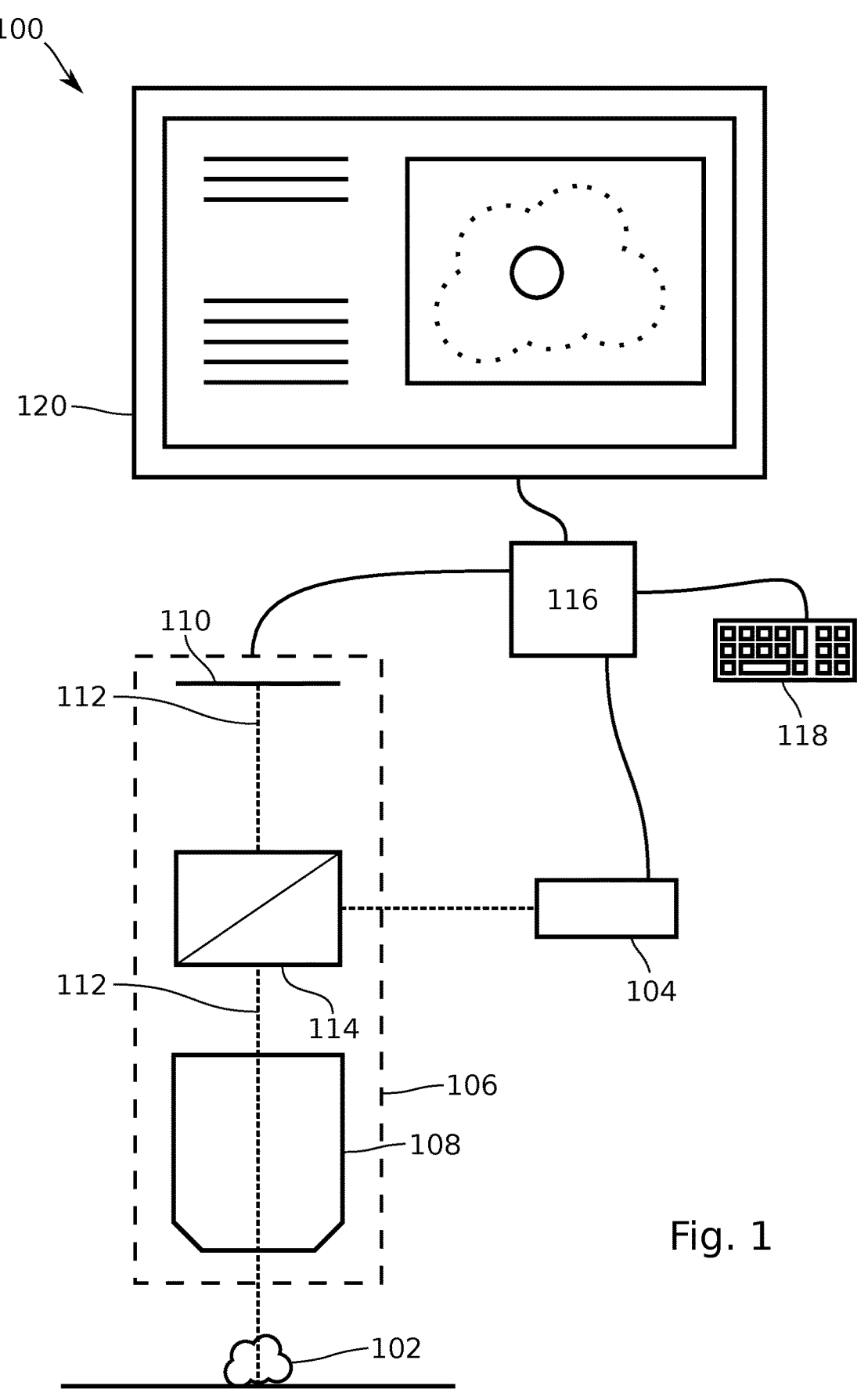
FIG. 1 illustrates a schematic view of a fluorescence microscope system according to an embodiment.

In an embodiment, the present invention provides a fluorescence microscope system and a method for generating a processed image of a sample with a fluorescence microscope system that can extract relevant information about the sample from a raw image of the sample in a reliable and robust manner.

In an embodiment, a fluorescence microscope system comprises an optical detection system configured to capture a raw image of the sample. The raw image comprises a plurality of pixels, each pixel having a brightness value. The fluorescence microscope system further comprises a processor. The processor is configured to determine invalid pixel in the raw image, to assign a predetermined value to each invalid pixel, to determine a range of brightness values comprising the brightness values of a majority of the plurality of pixel excluding the invalid pixel, and to generate a processed image of the sample based on the determined range of brightness values.

The predetermined value may be a numerical brightness value, NaN or another numerical or non-numerical data type. By assigning the invalid pixel the predetermined value, the invalid pixel is marked. Since the predetermined value replaces the brightness value of the invalid pixel, no further memory is needed to store the information whether a certain pixel is valid or not. Further, the predetermined value can easily be filtered by common image analysis and manipulation programs. Thus, marking the invalid pixel with the predetermined value also increases interoperability.

All non-invalid pixels of the raw image are called valid pixels in the following. The brightness value of these valid pixels corresponds to a fluorescence intensity measured and/or determined by the fluorescence microscope system. Thus, the valid pixels comprise the relevant information about the sample that is observed with the fluorescence microscope system. When selecting the range of brightness values, the predetermined value is excluded. In other words: By excluding the predetermined value, only the valid pixel, i.e. the pixel most likely containing the relevant information about the sample, are taken into account when determining the range of brightness. Thereby, the fluorescence microscope system extracts the relevant information about the sample from the raw image in a reliable and robust manner. The processed image is then generated based on the range of brightness values, for example by extending or stretching the range of brightness values to a full dynamic range.

In an embodiment, the processor is configured to assign a different color value to each brightness values of the range of brightness values, and to generate the processed image as a false color image based on said assignment. Preferably, all color values have the same hue. In this embodiment, the fluorescence microscope system assists a user in identifying the relevant information in the processed image by presenting them with a colored image of the sample. Thereby, the fluorescence microscope system allows the user to work more efficiently.

In an embodiment, the processor is configured to assign a predetermined color value to the predetermined value, and to generate the processed image as a false color image based on said assignment. Preferably, the predetermined color value is a complementary color to a hue of the range of color values. In this embodiment, the invalid pixel are highlighted in the processed image. This allows the user to identify them quickly and allows them to work more efficiently.

In an embodiment, the fluorescence microscope system has a memory element. The memory element comprises at least one look-up table. The look-up table correlates brightness values to color values. The processor is configured to generate the processed image as a false color image based on the look-up table. In this embodiment, a relationship between the brightness values of the raw image and the color values of the processed image is stored in form of a look-up table. Alternatively, the relationship between the brightness values of the raw image and the color values of the processed image may be stored in form of a functional relationship.

In an embodiment, the processor is configured to determine whether a pixel of the raw image is saturated, and to determine each saturated pixel as one of the invalid pixels. A pixel of the raw image is saturated when its brightness value is at the maximum value. This means, for example that the fluorescence intensity received at the detector position corresponding to the respective pixel exceeded the dynamic range of the detector. The high fluorescence intensity may for example be the result of a dense protein buildup in the sample. The actual value of the fluorescence intensity may therefore be much higher than the detected maximum value. Thus, the saturated pixels do not represent actual data and need to be discarded, i.e. determined to be invalid.

In an embodiment, the processor is configured to determine whether the brightness value of a pixel of the raw image is the result of a calculation error and/or the result of a detection error, and to determine each such pixel as one of the invalid pixel. A calculation error may for example occur during spectral unmixing. An example of a detection error is a light sheet artifact. Both calculation errors and detection errors do not represent actual data, and therefore need to be determined to be invalid.

In an embodiment, the processor is configured to determine a confidence value for each pixel of the raw image, and to determine each pixel having a confidence value below a predetermined threshold as one of the invalid pixel. In this embodiment, the raw image may be obtained using, for example, a machine learning algorithm that assigns a confidence value to each pixel of the raw image. The confidence value is a measure of the certainty with which the processor has determined the brightness value of the respective pixels. The lower the confidence value, the less trustworthy the data. Thus, by disregarding pixel having a low confidence value, the processed image becomes more representative of the actual sample.

In an embodiment, the processor is configured to determine a brightness histogram of the raw image after the processor assigned the predetermined value to each invalid pixel, the brightness histogram comprising the number of pixel for each brightness value. The processor is configured to determine the range of brightness values based on the brightness histogram. In particular, the processor is configured to exclude the predetermined brightness value from the brightness histogram. The brightness histogram counts the number of pixel of the raw image for each brightness value. By analyzing the brightness histogram, in particular for peaks and valley in the plot of the brightness histogram, the processor can determine the range of brightness values.

In an embodiment, the predetermined value is a minimum brightness value or a maximum brightness value. Neither the minimum brightness value nor the maximum brightness value are likely to comprise actual information about the sample. The minimum brightness value and the maximum brightness value may therefore be used to mark the invalid pixel without the loss of actual information. This saves memory, since the brightness value of the invalid pixel is replaced.

In an embodiment, the fluorescence microscope system comprises an illumination system configured to emit excitation light for exciting at least one fluorophore located within the sample. The optical detection system is configured to generate the raw image based on fluorescence light emitted by the excited fluorophores. In this embodiment, the brightness values of the raw image correspond to the intensity of the fluorescence light emitted by the excited fluorophores. The illumination system may comprise one or more light sources, in particular coherent light sources, configured to emit the excitation light. When the illumination system comprises two or more different light sources, the light sources may be configured each to generate a specific excitation light. Alternatively, the illumination system may comprise a comprises a white light source, and an interchangeable filter unit that comprises two or more filters which block all wavelengths of the white light except for a single wavelength or a range of wavelengths in order to generate different excitation lights.

In an embodiment, the fluorescence microscope system is configured for fluorescence widefield microscopy. Additionally, or alternatively, the fluorescence microscope system is configured for confocal laser scanning microscopy.

In an embodiment, the fluorescence microscope system comprises an output unit configured to display the raw image and/or the processed image.

In an embodiment, the present invention further provides a method for generating a processed image of a sample with a fluorescence microscope system. The method comprises the following steps: Capturing a raw image of the sample with an optical detection system of the microscope system, the raw image comprising a plurality of pixels, each pixel having a brightness value. Determining invalid pixels in the raw image. Assigning a predetermined value to each invalid pixel. Determining a range of brightness values comprising the brightness values of a majority of the plurality of pixel excluding the invalid pixels. Generating a processed image of the sample based on the determined range of brightness values.

In an embodiment, a method has the same advantages as the fluorescence microscope system described above. In particular, the method can be supplemented using the features directed at the fluorescence microscope system.

FIG. 1 is a schematic view of a fluorescence microscope system 100 according to an embodiment.

Figures 3A, 3B:
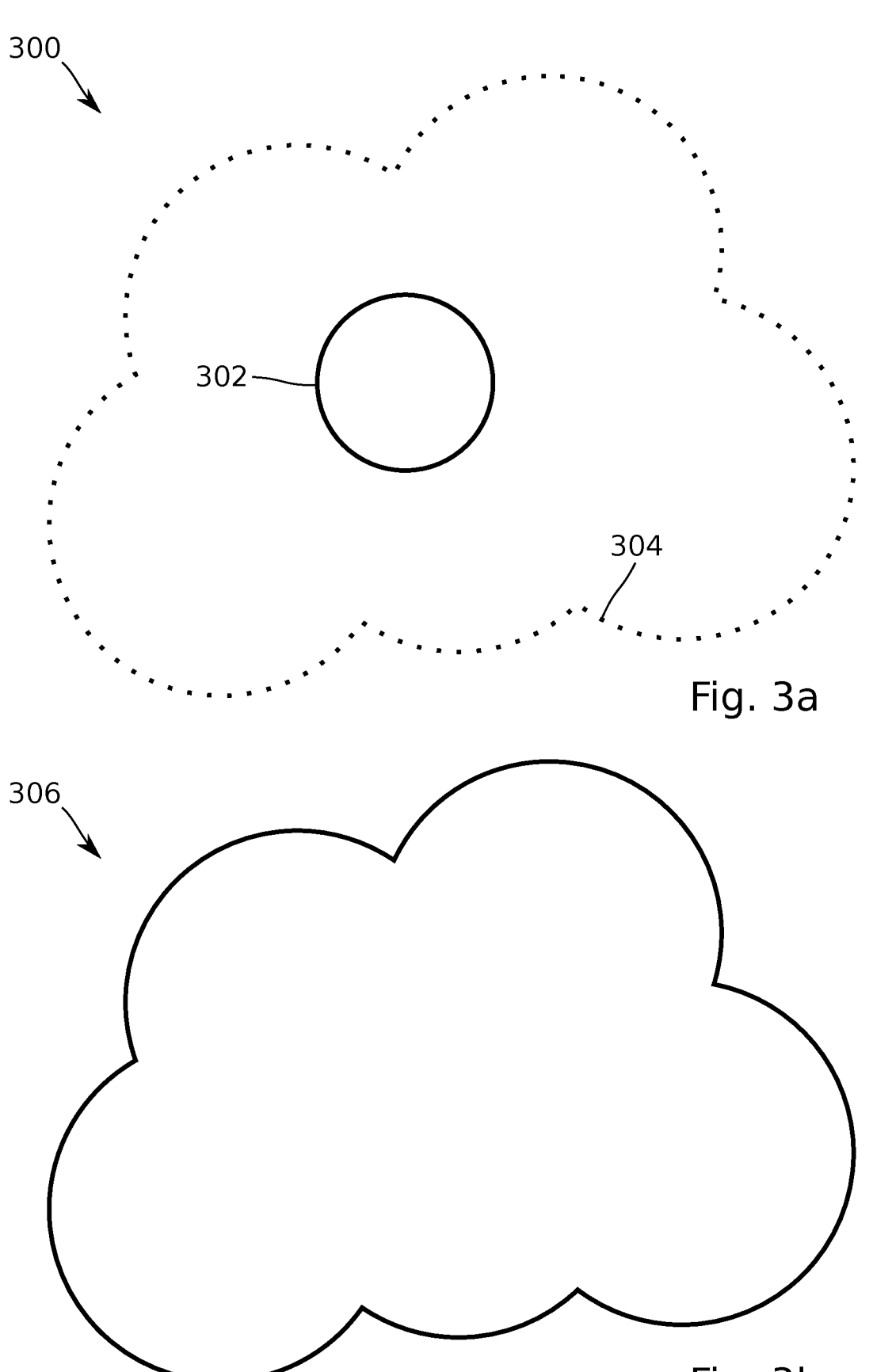
FIG. 3a illustrates a schematic view of a raw image.
FIG. 3b illustrates a schematic view of a processed image.

The fluorescence microscope system 100 is configured to capture a raw image 300 (c.f. FIG. 3a) of a sample 102 by means of fluorescence microscopy. An illumination system 104 of the fluorescence microscope system 100 is configured to generate excitation light for exciting fluorophores located inside a sample 102. An optical detection system 106 of the fluorescence microscope system 100 is configured to generate the raw image of the sample 102 based on fluorescence light emitted by the excited fluorophores. The optical detection system 106 comprises an objective 108 directed at the sample 102, and a detector element 110. The objective 108 receives the fluorescence light emitted by the excited fluorophores and directs the fluorescence light into a detection beam path 112. In the present embodiment, a beam splitter 114 is located at an intersection of the illumination beam path and the detection beam path 112, which are perpendicular to each other in the present embodiment. The beam splitter 114 is configured such that the excitation light is directed into the sample 102 via the objective 108. The beam splitter 114 is further configured such that the fluorescence light received by the objective 108 is directed towards detector element 110.

The fluorescence microscope system 100 further comprises a processor 116, an input unit. and an output unit. The processor 116 is connected to the illumination system 104 and the optical detection system 106 and configured to control the illumination system 104 and the optical detection system 106 in order to acquire the raw image 300 of the sample 102. The processor 116 is connected to an input unit 118, and an output unit 120 and configured to receive a user input via the input unit 118. In the present embodiment, the input unit 118 is exemplary configured to be a computer keyboard. Alternatively, other input units such as a computer mouse, a joystick or a track ball may be used. In particular, the fluorescence microscope system 100 is setup up such that many different input devices may be used. Thereby, a user may select the input device they are most comfortable with.

The control unit is further configured to perform a method for generating a processed image of the sample 102 from the raw image 300, and to output the raw image 300 and processed image 306 (c.f. FIG. 3b) to the user via the output unit 120. The method is described below with reference to FIG. 2 to 4.

Figure 2:
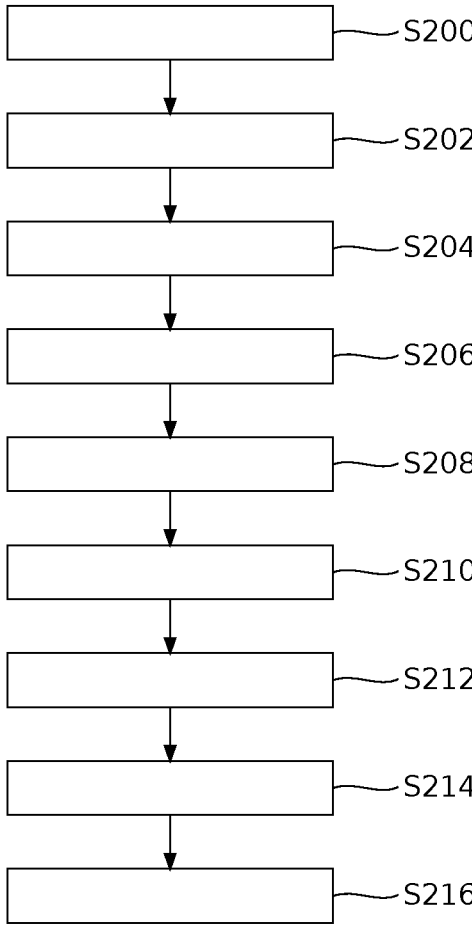
FIG. 2 illustrates a flowchart of the method for generating a processed image of the sample with the fluorescence microscope system according to FIG. 1.

FIG. 2 is a flowchart of the method for generating a processed image 306 of the sample 102 with the fluorescence microscope system 100 described above.

The process is started in step S200. In step S202 the processor 116 controls the illumination system 104 to emit the excitation light in order to excite the fluorophores located inside the sample 102. The processor 116 also controls the optical detection system 106 to capture the fluorescence light emitted by the excited fluorophores, and generates the raw image 300 from the captured fluorescence light. The raw image 300 comprises a plurality of pixel, each pixel having a brightness value. Step S202 may be triggered by a user input. In step S204 the processor 116 determines invalid pixel in the raw image 300. The invalid pixel may be saturated pixel, the result of a calculation error or the result of a detection error. In any case, the invalid pixel do net represent actual data. In step S206 the processor 116 assigns each invalid pixel a predetermined brightness value. The predetermined value may be a maximum value, a minimum value or another data type such as NaN, and uniquely marks the pixel as an invalid pixel. All other pixel of the raw image 300 are called valid pixel in the following. The result of step S206 is a modified raw image 300.

Figure 4:
FIG. 4 illustrates a brightness histogram of a raw image.
Figure 4:
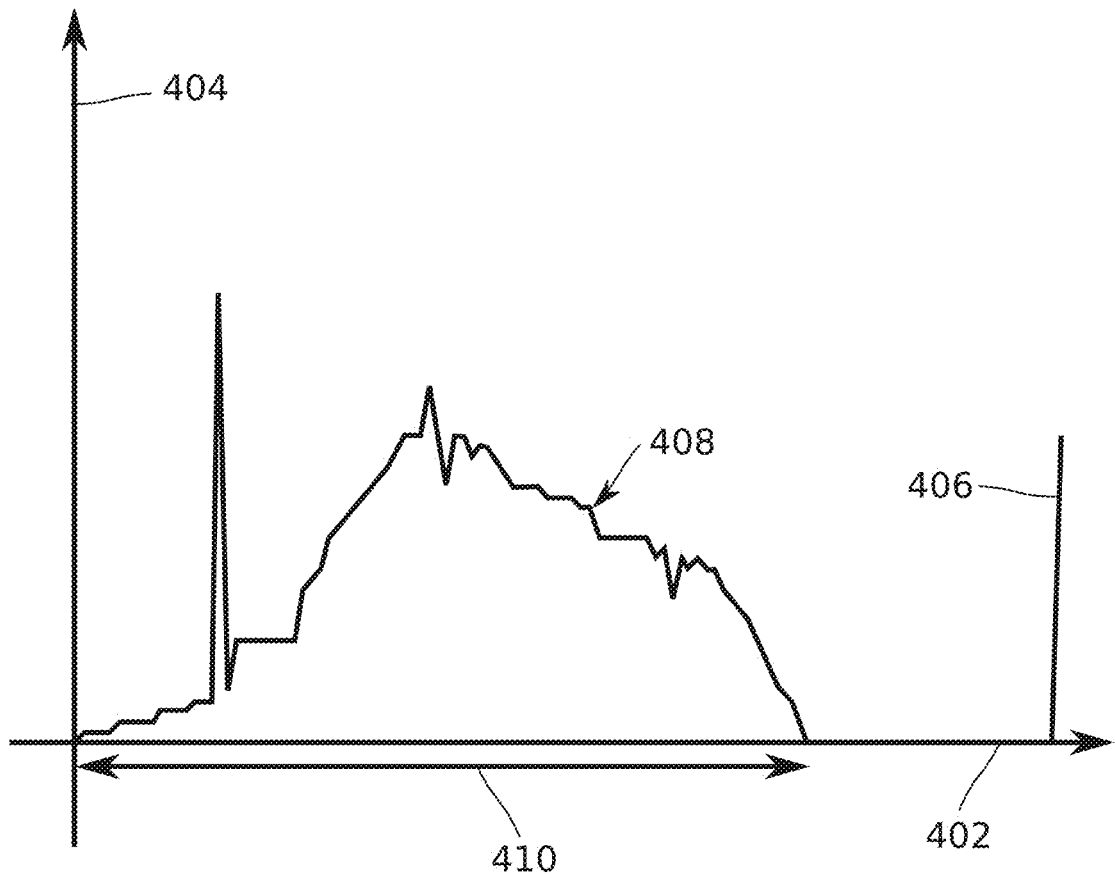

In an optional step S208 the processor 116 determines a brightness histogram 400 (c.f. FIG. 4) of the modified raw image 300. The processor 116 may output the brightness histogram 400 to the user via the output unit 120. In step S210 the processor 116 determines a range of brightness values 410 (c.f. FIG. 4) that comprises the brightness values of a majority of the pixel of the modified raw image 300 but excluding the invalid pixel. When the brightness histogram 400 was determined in step S208, the determination of the range of brightness values 410 may be based on the brightness histogram 400. In particular, the determination of the range of brightness values 410 may be based on an analysis of a plot of the brightness histogram 400, for example by analyzing the brightness histogram 400 for peaks. The determination of the range of brightness values 410 based on the brightness histogram 400 is described below in more detail with reference to FIG. 4.

In step S212 the processor 116 generates the processed image 306 of the sample 102 from the modified raw image 300 based on the range of brightness values 410. In particular, the processor 116 applies a look-up table to the modified raw image 300 that assigns each brightness value in the range of brightness values 410 a color value, preferably of a single hue. Thereby, a false color image is generated. In this embodiment, the look-up table is chosen such that the range of brightness values 410 is extended to the full dynamic range of the output unit 120. This means, that the invalid pixel and unused brightness values, i.e. brightness values that correspond to no or only a few pixel in the modified raw image 300, are discarded. Thereby, the actual data is made more visible to the user. Optionally, the look-up table may assign a predetermined color value to the predetermined brightness value, i.e. to the invalid pixel. Preferably, the hue of the color value used to mark the invalid pixel is complementary to the hue of the color values used to color the valid pixel. Thereby, the invalid pixel are clearly marked and visible to the user. In an optional step S214 the user may adjust the range of brightness values 410. When the user readjusts the range of brightness values 410, the processor 116 repeats step S212 using the adjusted range of brightness values 410. The process is ended in step S216.

FIG. 3a is schematic view of the raw image 300 of the sample 102.

The raw image 300 comprises a first area 302 made up of saturated pixel in the center of the sample 102. The saturated pixel are shown in FIG. 3a by a full line. The saturated pixel in the raw image 300 correspond to pixel of the detector element 110 which detected a fluorescence intensity exceeding the capacity of the respective detector pixel. The actual fluorescence intensity may be much higher than the maximum value assigned to the saturated pixel. The high fluorescence intensity may be for example due to a high concentration of fluorophores in the respective regions of the sample 102. Since the actual fluorescence intensity is outside the dynamic range of the detector element 110, the actual fluorescence intensity cannot be measured. The saturated pixel therefore do not represent actual data.

The raw image 300 further comprises a second area 304 made up of very dim pixel around the center of the sample 102. The dim pixel correspond to a weak fluorescence signal and are shown in FIG. 3a by a dotted line. In the raw image 300, the saturated pixel outshine the dim pixel such that the dim pixel are barely visible. For example, the dim pixel may have a brightness value between 0 and around 200 whereas the full range of brightness value is between 0 and 65536. In order to make structures of the sample 102 corresponding to the dim pixel visible, the brightness of the raw image 300 needs to be rescaled. For this, the processor 116 performs the method described above with reference to FIG. 2. The resulting processed image 306 described below with reference to FIG. 3b. In the above example, the processor 116 would determine the range of brightness value to be 0 to 200 and stretch this range of brightness values 410 to the full range in order to generate the processed image 306.

FIG. 3b is a schematic view of the processed image 306.

In the processed image 306, the dim pixel are clearly visible. This represented in FIG. 3a by the dim pixel being shown in a full line. The predetermined value with which the invalid pixel have been marked is outside the range of brightness value. Accordingly, the saturated pixel are not visible in the processed image 306.

FIG. 4 is the brightness histogram 400 of the raw image 300.

The abscissa 402 of the brightness histogram 400 denotes a brightness value. The ordinate 404 of the brightness histogram 400 denotes the number of pixel per brightness value. A single peak 406 to the right of the brightness histogram 400 represents invalid pixel that have been assigned the maximum brightness value as the predetermined value. The actual data is represented by the collection 408 of peaks and valley to the left of the brightness histogram 400.

The range of brightness values 410 determined in step S208 of the method described above with reference to FIG. 2 is shown in FIG. 4 by a double-headed arrow. The range of brightness can be determined from the brightness histogram 400 for example as the range comprising a predetermined percentage of all valid pixel. Alternatively, a maximum brightness value may be determined, for which the number of pixel having said brightness value is above a certain threshold. This maximum brightness value may then be set as the upper limit of the range of brightness values 410.

Identical or similarly acting elements are designated with the same reference signs in all Figures. As used herein the term "and/or" includes any and all combinations of one or more of the associated listed items and may be abbreviated as "/".

Both the individual features of the embodiments and all combinations of the features among each other are considered disclosed. Furthermore, the individual features of the embodiments are considered disclosed in combination with individual features or feature groups of the preceding description and/or in combination with individual features or feature groups of the claims.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a"

or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

100 Fluorescence microscope system
102 Sample
104 Illumination system
106 Optical detection system
108 Objective
110 Detector element
112 Detection beam path
114 Beam splitter
116 Processor
118 Input unit
120 Output unit
300 Image
302, 304 Area
306 Image
400 Brightness histogram
402 Abscissa
404 Ordinate
406 Peak
408 Collection
410 Range of brightness values
The invention claimed is:

1. A fluorescence microscope system comprising:
an optical detection system configured to capture a raw image of a sample, the raw image comprising a plurality of pixels, each pixel having a brightness value; and
a processor, configured to:
determine one or more invalid pixels in the raw image;
assign a predetermined value to each invalid pixel;
determine a range of brightness values comprising the brightness values of a majority of the plurality of pixels excluding the one or more invalid pixels; and
generate a processed image of the sample as a false color image by:
assigning a respective color value to each brightness value of the range of brightness values, such that the range of brightness values corresponds to a range of color values that is extended to a full dynamic range of an output unit configured to display the processed image, and
assigning a predetermined color value to the predetermined value, wherein the range of color values has a same hue, and the predetermined color value is a complementary color to the hue of the range of the color values.

2. The fluorescence microscope system according to claim 1, comprising a memory element, the memory element comprising at least one look-up table; wherein the look-up table correlates brightness values to color values; and wherein the processor is configured to generate the processed image as the false color image based on the look-up table.

3. The fluorescence microscope system according to claim 1, wherein the processor is configured to determine whether a pixel of the raw image is saturated, and to determine each saturated pixel as one of the one or more invalid pixels.

4. The fluorescence microscope system according to claim 1, wherein the processor is configured to determine whether the brightness value of a pixel of the raw image is a result of a calculation error and/or a result of a detection error, and to determine each such pixel as one of the one or more invalid pixels.

5. The fluorescence microscope system according to claim 1, wherein the processor is configured to determine a confidence value for each pixel of the raw image, and to determine each pixel having a confidence value below a predetermined threshold as one of the invalid pixels.

6. The fluorescence microscope system according to claim 1, wherein the processor is configured to determine a brightness histogram of the raw image after the processor assigns the predetermined value to each invalid pixel, the brightness histogram comprising the number of pixels for each brightness value; and wherein the processor is configured to determine the range of brightness values based on the brightness histogram.

7. The fluorescence microscope system according to claim 1, wherein the predetermined value is a minimum brightness value or a maximum brightness value.

8. The fluorescence microscope system according to claim 1, comprising an illumination system configured to emit excitation light for exciting at least one fluorophore located within the sample; wherein the optical detection system is configured to generate the raw image based on fluorescence light emitted by the excited fluorophores; and wherein the brightness values of the raw image correspond to a fluorescence intensity.

9. The fluorescence microscope system according to claim 1, wherein the fluorescence microscope system is configured for fluorescence widefield microscopy.

10. The fluorescence microscope system according to claim 1, wherein the fluorescence microscope system is configured for confocal laser scanning microscopy.

11. The fluorescence microscope system according to claim 1, comprising the output unit configured to display the raw image and/or the processed image.

12. A method for generating a processed image of a sample with a fluorescence microscope system, the method comprising:

capturing a raw image of the sample with an optical detection system of the microscope system, the raw image comprising a plurality of pixels, each pixel having a brightness value;

determining one or more invalid pixels in the raw image;

assigning a predetermined value to each invalid pixel;

determining a range of brightness values comprising the brightness values of a majority of the plurality of pixels excluding the one or more invalid pixels; and generating a processed image of the sample as a false color image by:

assigning a respective color value to each brightness value of the range of brightness values, such that the range of brightness values corresponds to a range of color values that is extended to a full dynamic range of an output unit configured to display the processed image, and assigning a predetermined color value to the predetermined value, wherein the range of color values has a same hue, and the predetermined color value is a complementary color to the hue of the range of the color values.

* * * * *